United States Patent [19]

Koel et al.

[11] 4,150,408

[45] Apr. 17, 1979

[54] THIN-FILM MAGNETIC HEAD FOR READING AND WRITING INFORMATION

[75] Inventors: Gerrit J. Koel; Frederik W. Gorter; Jan T. Gerkema, all of Eindhoven, Netherlands

[73] Assignee: U.S. Philips Corporation, New York, N.Y.

[21] Appl. No.: 857,774

[22] Filed: Dec. 5, 1977

Related U.S. Application Data

[62] Division of Ser. No. 705,050, Jul. 14, 1976, Pat. No. 4,100,583.

[30] Foreign Application Priority Data

Jul. 17, 1975 [NL] Netherlands ......................... 7508533

[51] Int. Cl.² .......................... G11B 5/12; B11B 5/30
[52] U.S. Cl. ..................................... 360/113; 360/119
[58] Field of Search .................. 360/113, 122; 324/46; 338/32

[56] References Cited

U.S. PATENT DOCUMENTS 3,947,889  3/1976  Lazzari ................................. 360/113

OTHER PUBLICATIONS

IBM Technical Disclosure Bulletin, vol. 15, No. 4, Sep. 72, pp. 1206–1207, "MR Read/Write Head", by Brock et al.

Primary Examiner—John H. Wolff
Attorney, Agent, or Firm—Thomas A. Briody; Robert S. Smith

[57] ABSTRACT

A thin-film magnetic head for writing information in and reading information from a track of a magnetic recording medium in which the head comprises a magnetically permeable yoke having two limbs between which a writing/reading gap is formed. In a construction in which the limbs of the yoke are opposite to each other, one limb is interrupted by a gap which is bridged by a magneto-resistive reading element.

2 Claims, 3 Drawing Figures

THIN-FILM MAGNETIC HEAD FOR READING AND WRITING INFORMATION

This is a division of application Ser. No. 705,050, filed July 14, 1976, now U.S. Pat. No. 4,100,583.

The invention relates to a thin-film magnetic head for reading information from and writing information in a track of a magnetic recording medium, comprising a magnetically permeable yoke, means coupled thereto for applying a writing current, and a magneto-resistive reading element bridging a gap between two parts of the yoke.

A thin-film magnetic head of the kind mentioned in the preamble is disclosed in U.S. Pat. No. 3,921,217. This known head consists of a three-limb yoke having two comparatively thick outer limbs and a comparatively thin central limb which is divided into two portions which are bridged by a magneto-resistive reading element, while the limbs are located one behind the other viewed in the direction of movement of a recording medium to be guided past the head. Furthermore, electrical conductors for applying a writing current are present in the spaces between the limbs. The writing gap is formed between the ends of the outer limbs and the reading gap is formed between one of the outer limbs and the central limb. Although such a configuration has the advantage that the magneto-resistive element is not subject to detrition due to its particular arrangement spaced from the tape contact face, it is a drawback that the outer limbs serve as a screen upon reading so that only high frequency signals reach the magneto-resistive element. Low frequency signals, as they occur, for example, in audio recordings, can hence not be read by the head. In addition, the construction of a head having a three-limb yoke in thin-layer technique is in itself a complicated operation.

It is the object of the invention to provide a head of the kind mentioned in the preamble which does not exhibit the said drawbacks.

For that purpose, the head according to the invention is characterized in that the yoke has two limbs, a writing/reading gap being formed between the ends of the limbs.

The advantage of the head according to the invention is that the limbs of the yoke do not operate as screens but on the contrary pass the magnetic flux from the recording medium to the magneto-resistive element. As a result of this, the head is also sensitive to long-wave signals and thus has a wide-band reproduction characteristic. The resolving power is equal to that of an inductive reading head having the same yoke configuration. In addition, due its simple configuration, the two-limb magnetically permeable yoke of the head according to the invention can easily be manufactured by means of thin-layer techniques. An extra advantage is that this yoke configuration can be constructed both with limbs which are located opposite to each other at the area of the writing/reading gap and with limbs which overlap each other at the aera of the writing/reading gap.

A first preferred embodiment of the magnetic head according to the invention is therefore characterized in that the limbs of the yoke are positioned straight opposite to each other and that one of the limbs is divided into two parts by a nonmagnetic gap which is bridged by the magneto-resistive element.

A second preferred embodiment of the magnetic head according to the invention is therefore characterized in that the ends of the limbs of the yoke overlap each other laterally at the area of the writing/reading gap and that the limbs, in a place spaced from the site of overlap, enclose between them a gap which is bridged by the magneto-resistive reading element.

In the second case it is of importance that during reading the connection between the two limbs of the yoke be given a high magnetic resistance in order that a maximum amount of magnetic flux will flow from the recording medium through the magneto-resistive element.

For that purpose, a further preferred embodiment of the magnetic head according to the invention is characterized in that the yoke, at the area of the connection between the two limbs, has an electric turn to locally saturate the magnetic material of the yoke during reading.

For that purpose, the magnetic head according to the invention is preferably constructed so that the yoke, at the area of the connection between the two limbs, has at least one window through which the said turn extends.

Within the scope of the present invention it is also possible to construct a magnetic head of the kind mentioned in the preamble in such manner that the head supplies a signal when it is not positioned above the centre of a track to be read. This signal may be used as a servo signal in a device which corrects the position of the head.

For that purpose, the head of the kind mentioned in the preamble is characterized in that the yoke has three limbs: one central limb being located in a first plane and two outer limbs being located in a second plane and meeting each other at the area of the central limb while forming a writing/reading gap between the central limb and the outer limbs, an auxiliary gap being present between the outer limbs at the area of the centre of the central limbs, and that each outer limb, in a place spaced from the writing/reading gap, is separated from the central limb by a gap, said gaps being each bridged by a magneto-resistive element, the magneto-resistive elements forming part of an electric circuit in which their signals are subtracted from each other and the difference signal is used to control the position of the head relative to the centre of the track.

In all the above-mentioned cases it is furthermore very practical to cause an electrical conductor to extend through the writing/reading gap through which the writing current is passed during writing.

The invention will now be described in greater detail, by way of example, with reference to the drawing.

Figure 1:
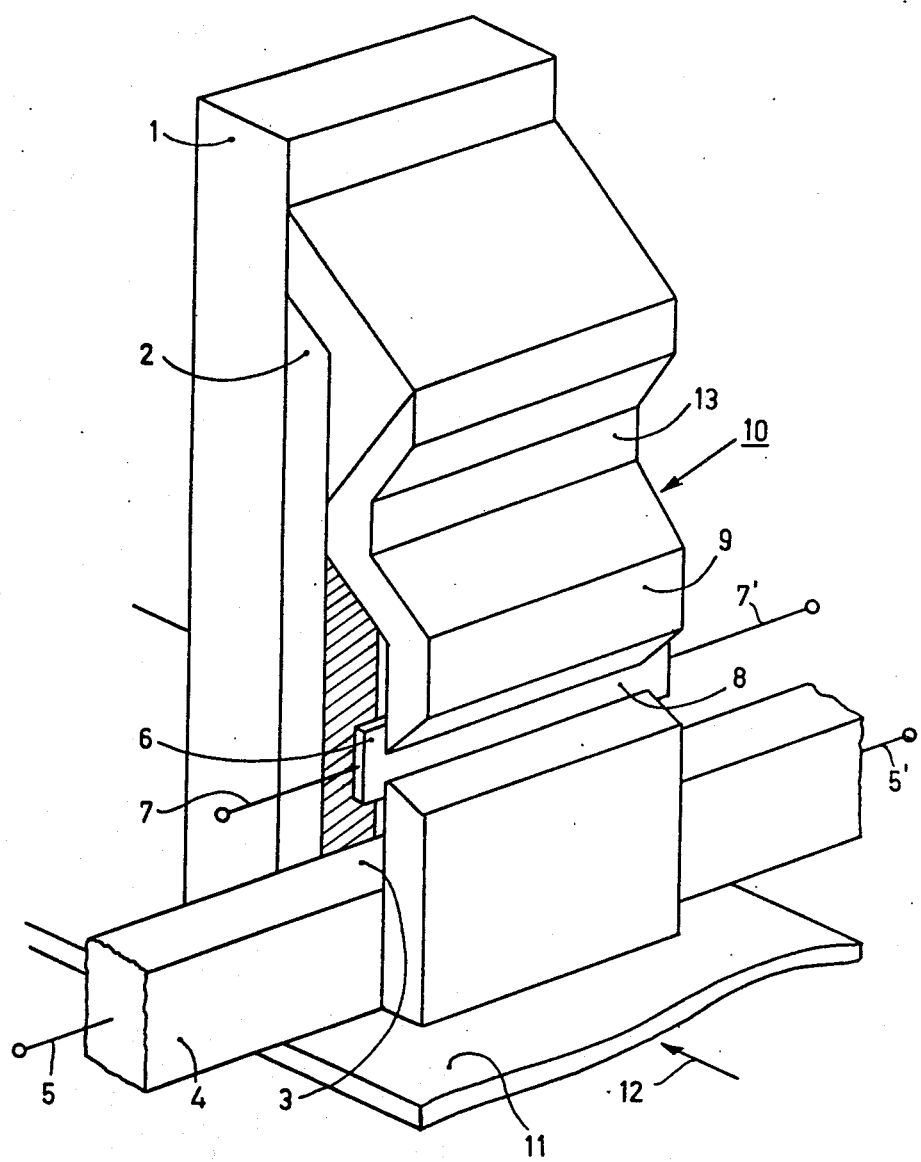
FIG. 1 is a simplified elevation of a first embodiment of the head according to the invention.

The embodiment shown in FIG. 1 is a head having two limbs 2 and 9 which are present straight opposite to each other and form part of the magnetic yoke 10. The said limbs enclose a writing/reading gap 3 through which a conductor 4 extends which is energized during writing operations. Other known means may also be used, however, to generate a writing flux in the magnetic yoke 10. The limb 9 is divided into two portions by a gap 8. Said gap 8 is bridged by a magneto-resistive reading element 6. The element 6 is shown in the space between the limbs but may also be provided on the outside of the limb 9. During reading operations, the resistance of the element 6 varies under the influence of magnetic fields detected by means of the gap 3 on a magnetic recording medium 11 which is moved past the head in the direction of the arrow 12.

The head is manufactured as follows. A nickel-iron layer 2 is sputtered to a thickness of 3.5 microns on an oxidized silicon substrate 1 (sputtering capacity: 1.25 W/sq.cm, 2% bias, argon pressure: 8 millitorr). A desired pattern is etched in the layer 2 by means of a photolithographic technique, the use of such a technique enabling a large number of heads to be provided simultaneously on the substrate 1. The edges of the nickel-iron pattern have a slope angle of approximately 30° so as to prevent restrictions from being formed during sputtering subsequent layers. In the U.S. application Ser. No. 708,078 it is disclosed how the use of a thin layer enables said etching of slopes.

Then a 1 micron thick quartz layer (not shown) is sputtered across the layer 2 (sputtering capacity: 1.5 W/sq.cm, 10% bias, argon pressure 10 millibar) and then a conductor layer 4 which is constructed from several sublayers (not shown). The layer 4 comprises an adhesive layer of molybdenum, 1000 Å thick, and a gold layer, 2 microns thick (both sputtered; sputtering capacity 1.5 W/sq.cm, argon pressure: 20 millitorr, no bias). A 1000 Å thick copper layer is then provided on the gold layer by electroless deposition and the desired pattern is then etched in the conductive layers. The copper top layer ensures that the edges of the etched pattern show a slope angle of approximately 30°.

The top layer is removed by means of dilute nitric acid after which the conductor pattern is provided with a 1000 Å thick molybdenum layer by means of sputtering and photolithographic methods. Across this is sputtered a quartz layer, 1 micron thick (not shown). Magneto-resistive material is then vapour-deposited up to a thickness of 500 Å. The magneto-resistive material is given the desired shape by etching (strip-like layer 6) and a layer of aluminum (not shown) is deposited on it in a thickness of 2000 Å. By means of this layer, which is also etched to the desired shape, the necessary connections 7 and 7' to an electric circuit are made. A 1000 Å thick quartz layer (not shown) is then sputtered and a connection hole 13 through the provided quartz layers is then made. A 3.5 microns thick nickel-iron layer 9 is sputtered which contacts the layer 2 at the area of the connection hole so that the layers 2 and 9 form a magnetically permeable yoke. The layer 9 is given a desired shape by means of photolithographic methods. It is characterized by a gap 8 at the area of the magneto-resistive layer 6. In order to effect a maximum flux transfer to the layer 6, the edges of the gas 8 have a slope. Both the connections of the magneto-resistive layer 6 (denoted diagrammatically by 7 and 7') and the connections of the conductor layer 4 which forms a writing turn (shown diagrammatically by 5 and 5') may be thickened, if necessary, by means of sputtering methods or electroless methods so as to reduce their ohmic resistance and to produce connections to an external electric circuit more easily.

Figure 2:
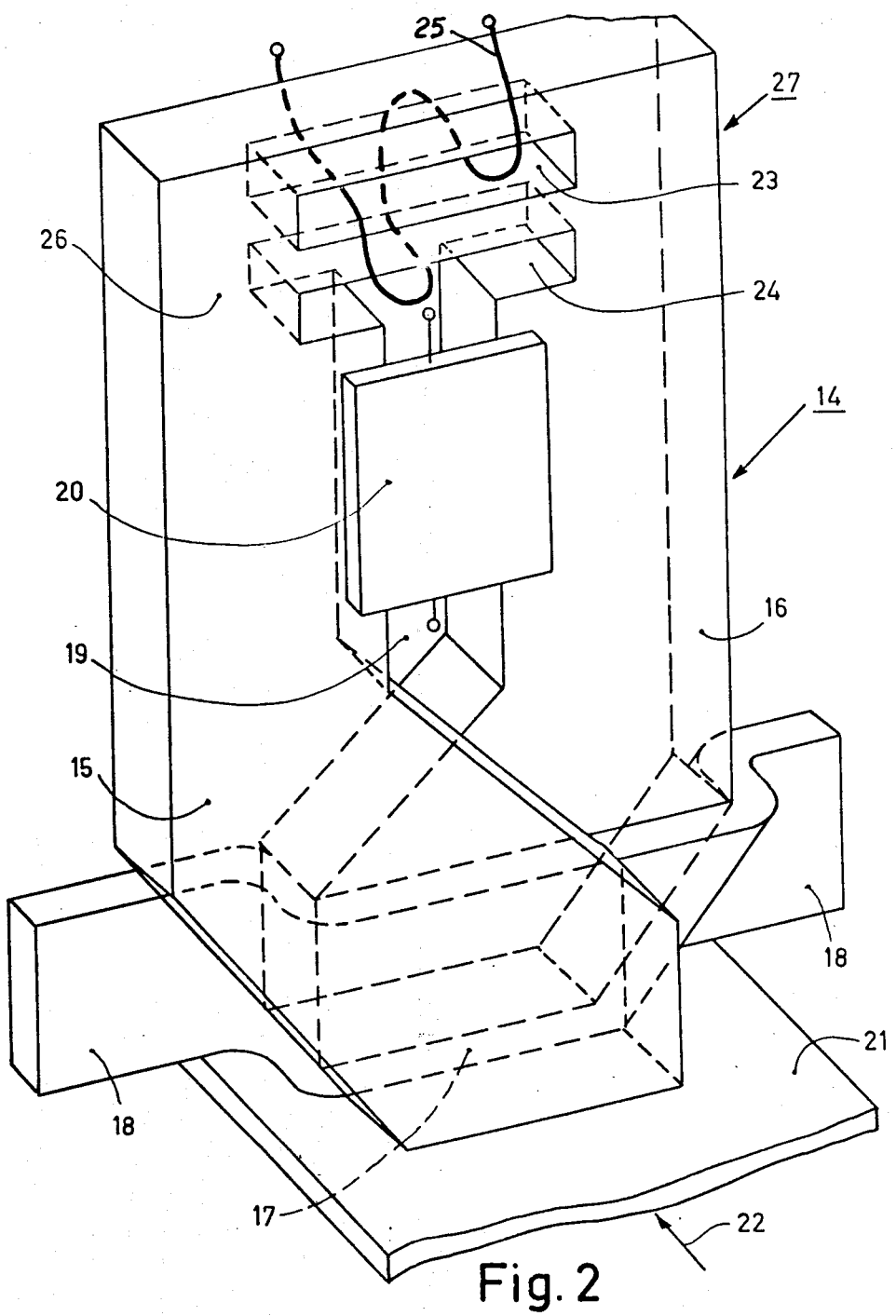
FIG. 2 is a simplified elevation of a second embodiment of a magnetic head according to the invention.

The embodiment shown in FIG. 2 relates to a construction of a head having two limbs 15 and 16 overlapping each other laterally and forming part of the magnetic yoke 14. They enclose a writing/reading gap 17 through which a conductor 18 extends which is energized during writing operations. Other known means, however, may also be used to produce a writing flux in the magnetic yoke. A further gap 19 which is bridged by a magneto-resistive element 20 is present between the two limbs 15 and 16. During reading operations the resistance of the element 20 varies under the influence of magnetic fields detected via the gap 17 on a magnetic recording medium 21 which is moved past the head in the direction of the arrow 22.

In order to ensure that the magnetic flux of the recording medium passes through the magneto-resistive element 20, the yoke 14 at the area of the rear circuit 27 comprises an electric conductor 25 which is wound through the windows 23 and 24 in such manner that upon energization of the conductor 25 the rear circuit 27 is magnetically saturated. No magnetic flux can be induced in the rear circuit 27 by the conductor 25.

During writing operations the rear circuit 27 is not saturated magnetically to ensure a good writing efficiency.

The technological construction of this embodiment of the head is in outline the same as that of the construction of the head shown in FIG. 1.

Figure 3:
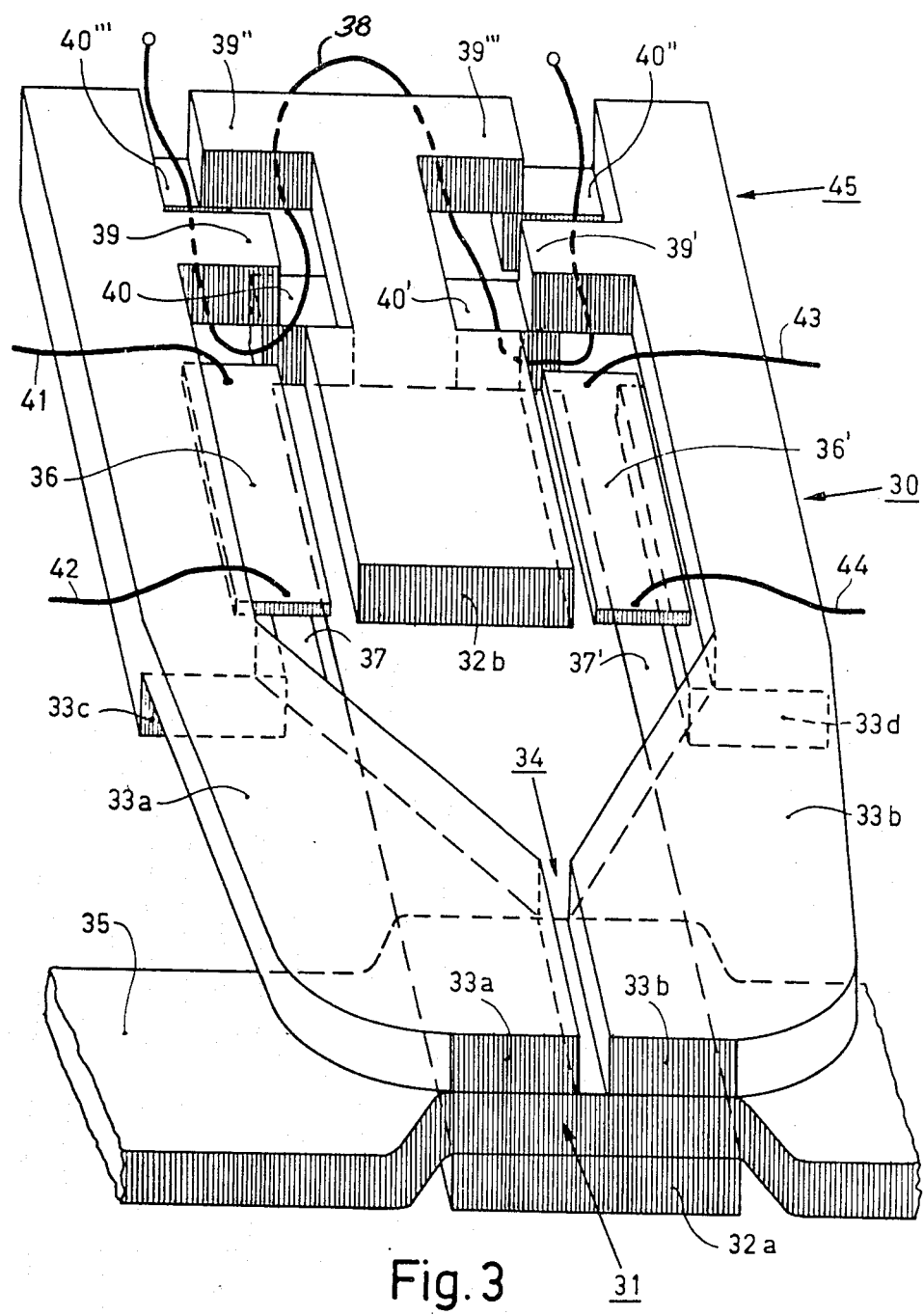
FIG. 3 is a simplified elevation of a third embodiment of the magnetic head according to the invention.

The head of FIG. 3 comprises a yoke 30 of a nickel-iron alloy formed by two parts which, at the area of the writing/reading gap 31 are separated from each other by a conductor 35 and, at the area of the rear circuit 45, are connected together by means of projections 39, 39', 39'', 39''', and 40, 40', 40'', 40'''. One part is denoted by 32a, the other one, which is divided into two parts by the etched auxillary gap 34, is denoted by 33a and 33b.

In varous places the thickness of the yoke 30 is enlarged by stacking two layers one on top of the other; for example, part 33a has been made thicker by means of part 33c, while the yoke part 33b is present on part 33d and part 32b is present on part 32a.

Across the gap 37, a thin layer 36 of a magneto-resistive material is arranged such that the layer 36 bridges the part 32a and 33c but is enclosed by the parts 32b and 33a. In the same manner a thin layer 36' of a magneto-resistive material is present across the gap 37' such that the layer 36' bridges the parts 32a and 33d but is enclosed by the parts 32b and 33b.

Connections 41, 42 and 43, 44, respectively, to an information-processing electronic circuit are shown diagrammatically in the Figure.

The face formed by the boundary of the parts 32a, 33a, 33b and 35 during operation is moved in intimate contact with a recording medium (not shown).

The layer thicknesses and the technology of the construction are described hereinafter.

(1) First a 35,000 Å thick nickel-iron layer is deposited on a substrate (not shown) by sputtering in such manner that the coercive force of the deposited layer material is below 0.5 Oersted.

(2) This layer is etched with a known etchant after partial covering with a photolacquer in such manner that the parts 32a, 33c, 33d and 40 are formed.

(3) After providing a 1 μm thick insulating layer of SiO$_2$ on the above-mentioned parts and etching holes therein, there is provided a conductor layer which is grown electrolytically to 20,000 Å in a lacquer mask and on a previously provided thin metal layer (cathode). This constitutes the writing conductor 35 and a conductor 38 as well as the leads 41, 42 and 43, 44.

(4) After removing the lacquer mask and the thin metal layer therebelow, a new insulator layer is provided which is also sputtered.

(5) The material (Ni(80)Fe(20)) to form the magneto-resistive layers 36 and 36', 500 Å thick, is then vapour-deposited.

(6) The parts 33a, 33b, 32b and 39 are grown electrolytically to 20,500 Å.

(7) By sputtering, 500 Å of material is removed everywhere outside the parts 36, 36' so that a head of the shape shown is formed.

(8) This is then covered by an insulating layer and, if desired, completed with a rigid cover plate.

The connections 41, 42 and 43, 44 of the layers 36 and 36' are connected in a Wheatstone bridge which gives a signal proportional to the difference of signals detected via the yoke halves 32a, 33a and 33b, respectively. This difference is a measure of the place of the head relative to the centre of a read track. The layers 36, 36' are previously provided with means to ensure a linear reproduction characteristic. See Belgian Pat. No. 827,434.

The selection of one head from a row of several of such heads can be done in a writing operation by either providing only the selected head with current through the writing conductor 35, or providing all the heads in series with a writing current through the conductor 35 and saturating magnetically all heads but one by means of conductor 38 in the rear circuit so that only the selected head has a good efficiency. Upon reading, the selection may be effected by selecting the connections to the layers 36, 36', but the selected-head must at any rate be saturated by means of the conductor 38 in the rear circuit 45 in order to channel the magnetic flux of the recording medium through the layers 36, 36'.

What is claimed is:

1. A thin-film magnetic head for reading information and writing information in a track of an associated magnetic recording medium which comprises: a magnetically permeable yoke having only first and second substantially parallel and elongated limbs, said first limb having a first elongated gap parallel to the plane of the associated recording medium and intermediate first and second parts thereof, and a magneto-resistive reading element bridging said first gap, said first and second limbs being disposed in spaced relationship with a reading/writing gap between the free ends of said limbs said reading/writing gap being parallel to said first gap and, said magneto-resistive element being disposed in spaced relationship from the associated recording medium and said reading/writing gap, an electric conductor disposed within said reading/writing gap contiguous to said free end, said conductor cooperating with an associated means for producing a writing current during writing.

2. A magnetic head as claimed in claim 1, wherein said limbs having first and second elongated sides, said first elongated sides being coplanar proximate to said reading/writing gap and said second elongated sides being coplanar proximate to said reading/writing gap all of said coplanar sides being disposed normal to said gaps.

* * * * *